United States Patent [19]

Jamaluddin

[11] 4,242,084
[45] Dec. 30, 1980

[54] AIR POLLUTION CONTROL AND HEAT RECOVERY SYSTEM FOR INDUSTRIAL OVENS

[76] Inventor: Aziz A. Jamaluddin, 1912 Nursery Rd., Woodlands, Tex. 77380

[21] Appl. No.: 48,980

[22] Filed: Jun. 15, 1979

[51] Int. Cl.$^3$ .......................... F27D 17/00; F26B 19/00
[52] U.S. Cl. ........................................... 432/1; 34/86; 432/28; 432/72; 432/90
[58] Field of Search .......................... 432/1, 28, 72, 90; 34/86

[56] References Cited

U.S. PATENT DOCUMENTS

| | | | |
|---|---|---|---|
| 3,472,498 | 10/1969 | Price et al. | 432/72 |
| 4,067,382 | 1/1978 | English | 34/86 |
| 4,176,162 | 11/1979 | Stern | 432/72 |

*Primary Examiner*—John J. Camby
*Attorney, Agent, or Firm*—Neal J. Mosely

[57] ABSTRACT

A system of air pollution control and heat recovery is provided for an arrangement of industrial ovens, especially for drum manufacture.

A plurality of paint bake ovens of various capacities, lengths and heat input are provided for multi-stage processing in the manufacture of drums and lids therefor. A supply of high temperature water is provided for multi-stage cleaning and rinsing in the manufacturing operation.

The combined exhaust from all of the ovens at 25% LEL is preheated in a heat exchanger and then all of the combustible components are burnt off by passing through the flames of an incinerator grid burner. The effluent from the burner first passes through the heat exchanger to preheat said oven exhaust gases and then through hot water coils to provide all of the necessary hot water for the system. High pressure hot water (275°) is provided in this heat exchange operation. The hot gasses from the last heat exchanger, completely free of combustible contaminates, are mixed with fresh air to supply hot air for the dryers used in the process. There is a substantially complete recovery of heat and the gasses discharged to atmosphere meet air quality standards.

9 Claims, 1 Drawing Figure

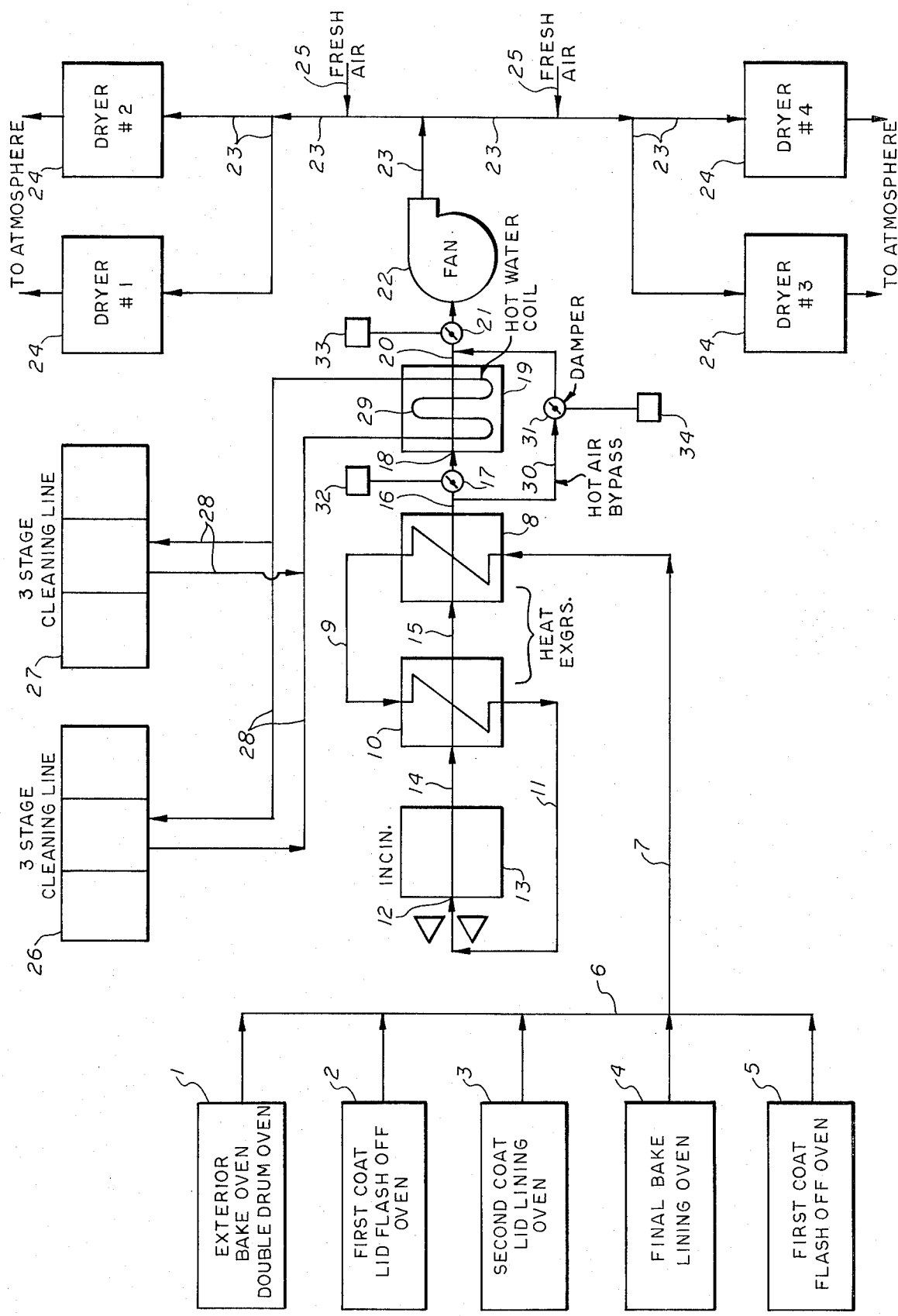

4,242,084

AIR POLLUTION CONTROL AND HEAT RECOVERY SYSTEM FOR INDUSTRIAL OVENS

FIELD OF THE INVENTION

This invention relates to new and useful improvements in the operation of industrial ovens, especially baking or curing ovens for painted or coated products. The invention is particularly concerned with an arrangement of industrial ovens having a system of air pollution control and heat recovery.

BRIEF DESCRIPTION OF THE PRIOR ART

In painting or coating industrial products, such as metal coils, pipes, drums and the like, it is well known to use gas-fired ovens which will dry painted or coated products and yield a gaseous effluent containing a substantial amount of combustible constituents such as hydrocarbons. Such ovens may be operated at low temperature, intermediate temperature, or high temperature, depending upon the type of coating and the particular stage in the processing of the coated product. It is common in the operation of industrial ovens to vent the gaseous effluent from individual ovens into separate fume incinerators. It is also known to recover heat from the operation of industrial ovens and also to recover heat from the combustion of combustible products which are contaminants from a baking or curing oven effluent.

The prior art, however, does not suggest arrangements which are substantially complete in elimination of combustible constituents in the off gasses from treating ovens and which provide for substantially total heat recovery at the same time.

SUMMARY OF THE INVENTION

It is one object of this invention to provide a new and improved arrangement of industrial ovens having an associated system of air pollution control and heat recovery.

Another object of this invention is to provide an improved system of air pollution control and heat recovery for industrial ovens in which combustible constituents, such as hydrocarbons in the exhaust air stream from the ovens are burnt off and the heat of combustion is substantially completely recovered.

Another object of this invention is to provide an improved system of air pollution control and heat recovery wherein the combustion of hydrocarbons or other combustible constituents in other exhaust gasses is completely burned and the heat of combustion exchanged to a hot water system and/or a system of dryers used in the process with which the ovens are associated.

Other objects of the invention will become apparent from time to time throughout the specification and claims as hereinafter related.

A system of air pollution control and heat recovery is provided for an arrangement of industrial ovens, especially for drum manufacture, which attains the aforementioned objective.

A plurality of paint bake ovens (or ovens for other purposes) of various capacities, lengths, and heat input are provided for multi-stage processing in the manufacture of various types of equipment, especially drums and lids for drums. In such a process, a supply of high temperature, high pressure water is provided for multi-stage cleaning and rinsing in the manufacturing operation.

The combined exhaust from all of the processing ovens is collected at a rate providing a combustible constituent content of about 25% LEL (lower explosive limit) and the combined exhaust is preheated in a heat exchanger and then all the combustible components, such as hydrocarbons, are burnt off by passing through the flames of an incinerator grid burner. The combustion effluent from the burner first passes through the aforementioned heat exchanger to preheat said oven exhaust gasses on their way to the incinerator grid burner. The effluent gasses are then passed through hot water coils to provide all of the necessary hot water for the system. High pressure, high temperature hot water (about 275° F.) is provided in this heat exchange operation. The hot combustion effluent gasses from the last heat exchanger, completely free of combustible contaminants, are mixed with fresh air air supplied by means of a blower to dryers used in the overall process. There is substantially complete recovery of heat and the gasses discharged to atmosphere meet air quality standards.

BRIEF DESCRIPTION OF THE DRAWING

The FIGURE shown is a schematic view of a system of ovens and associated air pollution control and heat recovery equipment associated therewith for elimination of combustible contaminants and recovery of heat for use in the process of which the ovens are a part.

DESCRIPTION OF THE PREFERRED EMBODIMENT

This pollution control and heat recovery system is for industrial ovens, particular paint bake ovens, or ovesn for drying or curing other coatings. In the drawing, there are shown five paint bake ovens for baking or curing coatings on drums and lids. The ovens are of various capacities, lengths and heat input. Exterior bake oven 1 is for baking or curing the exterior coating on drums. Oven 2 is an electrical infrared oven. Oven 3 is for drum lids. Oven 4 is for linings and Oven 5 is the prime bake oven.

The combustion chambers and fans (not shown) are mounted on top of the oven. Each combustion chamber is equipped with one 3,500,000 BTU/Hr burner and 30,000 CFM capacity recirculation fans. The ovens are capable of operating at 450°–500° F. These ovens are of high velocity design and are highly efficient using approximately 40—50% less fuel than a conventional convection oven.

The exhaust from all of the ovens 1-5 is collected through manifold 6 at a flow rate providing a 25% LEL content of hydrocarbons released in the baking or curing operation (calculated on the basis of solvent input)

Manifold 6 is connected by conduit 7 to one side of heat exchanger 8. The other side of heat exchanger 8 is connected by conduit 9 to one side of heat exchanger 10. The other side of heat exchanger 10 is connected by conduit 11 to the inlet 12 of an incinerator grid burner 13. Usually heat exchangers 8 and 10 are combined as two passes in a single heat exchanger. The outlet from incinerator grid burner 13 is connected by insulated conduit 14 to one side of heat exchanger 10. The other side of heat exchanger 10 is connected by insulated conduit to one side of heat exchanger 8. The outlet from heat exchanger 8 is connected by insulated conduit 16 to one side of damper 17 the other side of which is connected to the inlet 18 to heat exchanger 18 for producing high temperature, high pressure hot water.

The outlet from heat exchanger 19 is connected at 20 to one side of damper 21, the other side of which is connected to fan 22.

The hot gaseous combustion effluent reaching fan 22 is directed through conduits 23 to system of dryers 24. Conduits 23 have conduits or openings 25 which provide for the introduction of fresh air to mix with the hot gaseous effluent flowing to the dryers.

The system includes two three-stage cleaning lines 26 and 27 which store and supply hot water at about 180° F. for use in cleaning at various stages in the processing. The hot water for storage units 26 and 27 is supplied through conduits 28 which extend to a high temperature high pressure heating coil 29 in heat exchanger 19.

A bypass conduit 30 is provided around heat exchanger 19 and is controlled by damper 31. The dampers 17, 21 and 31 are controlled by thermostatic means 32, 33 and 34 responsive to the temperature of hot water circulating through heating coil 29. When the hot water temperature reaches a predetermined level, dampers 17, 21 and 31 are actuated to bypass the hot gaseous effluent through bypass conduit 30 directly to fan 22 without going through heat exchanger 19.

OPERATION

The operation of this equipment should be apparent from the aforementioned description but will be described in more detail for a more thorough understanding of the invention.

The apparatus shown in the drawing and described above, is a very efficient waste heat recovery apparatus which also functions as an efficient air pollution control system. The gaseous effluent from the several ovens 1-5 is collected through manifold 6 and has a hydrocarbon (or other combustible constituent) content of 25% LEL and is at a temperature of about 350° F. The exhaust from the ovens is conducted through heat exchangers 8 and 10 where it is preheated to a temperature of 850°-900° F. and then introduced into incinerator grid burner 13. Burner 13 includes a plurality of gas fired burner flames which insure a total incineration of the hydrocarbon (or other combustible) constituents. The effluent from this incinerator has a hydrocarbon content which is below the limits established by EPA as acceptable for discharge to the atmosphere. The combustion effluent from incinerator burner 13 is at a temperature of 1400° F. and is passed through heat exchanger 8 and 10 where it preheats the exhaust oven gasses from 350° F. to 850°-900° F. The combustion effluent has a temperature of about 850°-900° F. on leaving heat exchanger 8.

The hot gasses or combustion effluent then passes over hot water coil 29 in heat exchanger 19 where the gasses are cooled from 875° F. to about 545° F. at the inlet to fan 22. This temperature drop of combustion effluent is effective to heat the hot water circulating through coil 29 to a temperature of 275° F. (100 p.s.i.) at a rate of 300 GPM. The high pressure high temperature hot water from coil 29 is circulated through conduits 28 to storage units 26 and 27 where it mixes with cooler water to produce water stored at a temperature of 180° F. for use in chemical wash lines and other cleaning operations.

The combustion gasses reaching insulated fan 22 at a temperature of 545° F. are supplied through conduits 23 and mixed with fresh air through inlets 25 to provide 5,000 SCFM air at 350° F. to each of the dryers 24.

The thermostatic dampers 17, 21 and 34, operated by thermostatic means 32, 33 and 34, are operable to bypss the combustion gasses through line 30 around heat exchanger 19 directly to fan 22 whenever the water in coil 29 reaches a predetermined temperature.

This system of heat exchangers, dryers, water wash lines and the incinerator burner is operable to effect a substantially complete waste heat recovery from the exhaust gasses in the ovens. Waste heat is effective to 9,000 gallons of water to 180° F. for chemical wash lines and other cleaning operations. The system produces sufficient gaseous effluent to provide 20,000 CFM air at 350° F. to the four dryers used. The net effect of the system is substantially total waste heat recovery and substantially complete oxidation of hydrocarbons to produce an effluent meeting air quality standards.

While the invention has been described fully and completely with special emphasis upon a single preferred embodiment, it should be understood that within the scope of the appeneded claims the invention may be practiced otherwise than as specifically described herein.

I claim:

1. An air pollution control and heat recovery system comprising
   a plurality of paint baking and coating ovens,
   exhaust means for collecting the gases from said ovens containing combustible gaseous constituents at a concentration of about 25% LEL, a first heat exchanger positioned in said exhaust means for preheating said collected gases and combustible constituents to a predetermined elevated temperature
   a fume incinerator positioned to receive said preheated gases combustible constituents from said exhaust means,
   said incinerator having a plurality of flames operable to burn completely said combustible constituents to produce a gaseous effluent having a predetermined substantially higher temperature,
   means for conducting said completely burned gaseous effluent to said first heat exchanger to preheat said collected gases,
   a second heat exchanger for heating high temperature, high pressure water,
   means for conducting said gaseous effluent from said first heat exchanger to said second heat exchanger to heat water therein,
   hot water storage means,
   means for conducting water between said storage means and said second heat exchanger for supplying hot water for use in processing,
   at least one dryer for use in processing,
   a fan for supplying hot gases from said second heat exchanger to said dryer, and
   means for mixing fresh air with hot gases flowing to said dryer from said second heat exchanger.

2. A system according to claim 1 in which said first named heat exchanger preheats said collected gases to about 850°-900° F., the effluent from said incinerator is about 1400° F., and said second heat exchanger provides 300 GPM water at 275° F. and 100 PSI.

3. A system according to claim 1 including a conduit connected in parallel with and bypassing said second heat exchanger and operable to conduct hot gaseous effluent directly to said fan and damper means directing the flow of said hot gaseous effluent selectively through and around second heat exchanger.

4. A system according to claim 3 including thermostatic means responsive to the circulating water temperature to operate said dampers to cause said hot gaseous effluent to bypass said second heat exchanger when said water reached a predetermined temperature.

5. A system according to claim 4 in which said first named heat exchanger preheats said collected gases to about 850°–900° F., the effluent from said incinerator is at about 1400° F., and said second heat exchanger provides 300 GPM water at 275° and 100 PSI.

6. A system according to claim 4 in which said first heat exchanger is a shell and tube heat exchanger, and said second heat exchanger is a high pressure hot water coil over which said high temperature gaseous effluent passes.

7. A method of operating a system of paint baking and coating ovens and air pollution control and heat recovery apparatus associated therewith comprising collecting effluent gases containing combustible constituents at a concentration of about 25% LEL from a plurality of processing ovens, preheating said collected gases to a predetermined elevated temperature, burning said combustible constituents of said preheated gases in a fume incinerator having a plurality of flames, conducting the combustion effluent from said incinerator in heat exchange with said collected gasses to preheat the same, conducting said combustion effluent in heat exchange with circulating water to produce high pressure, high temperature water and circulating said heated water to storage, circulating said combustion effluent from said water heat exchange by means of a high temperature insulated fan to a forced circulation hot air dryer, and mixing said combustion effluent with fresh air prior to circulating the same into said dryer.

8. A method according to claim 7 in which said first named heat exchange preheats said collected gases to about 850°–900° F., said burning of said preheated gases produces a gaseous effluent at a temperature of about 1400° F., and said heat exchange with circulating water produces about 300 GPM water at 275° F. and 100 PSI.

9. A method according to claim 7 in which said circulating water temperature is sensed and said combustion effluent is bypassed around the point of heat exchange with said water when said water temperature exceeds a predetermined level.

* * * * *